S. TANSKI.
MOUSETRAP.
APPLICATION FILED DEC. 29, 1920.
1,375,980.
Patented Apr. 26, 1921.
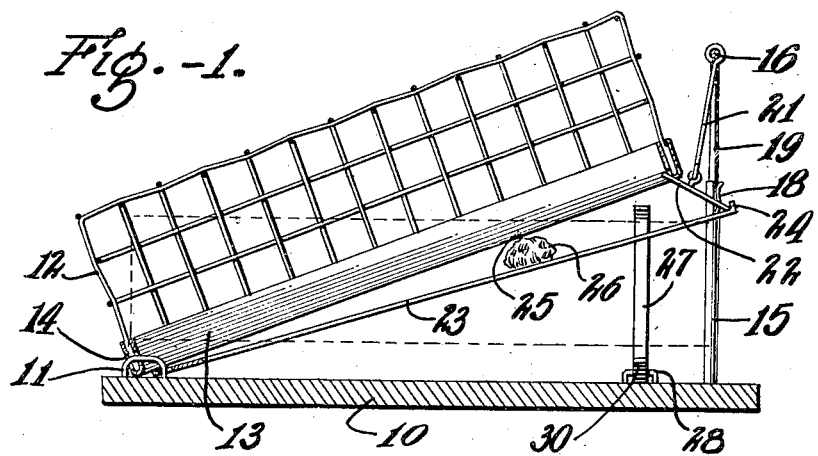
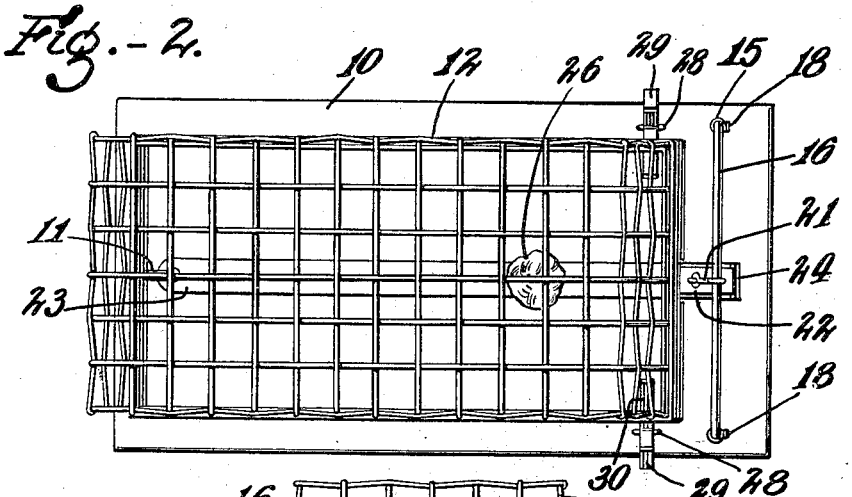
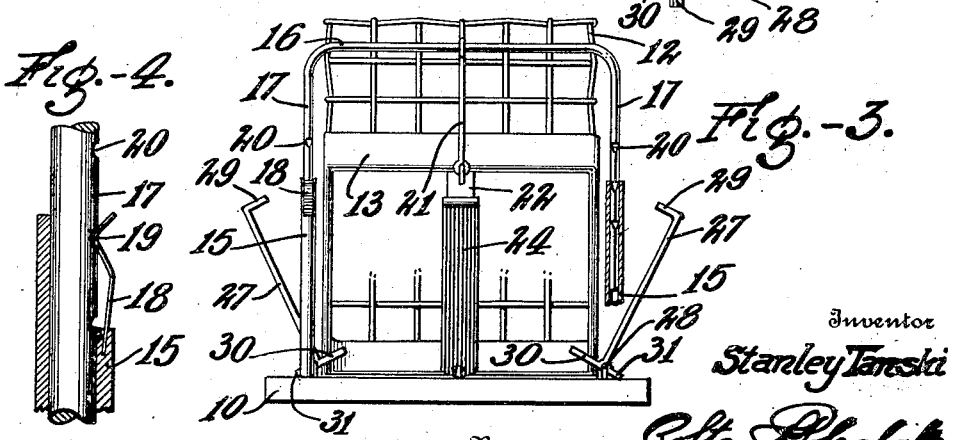
Inventor
Stanley Tanski

UNITED STATES PATENT OFFICE.

STANLY TANSKI, OF EAST VANDERGRIFT, PENNSYLVANIA.

MOUSETRAP.

1,375,980. Specification of Letters Patent. Patented Apr. 26, 1921.

Application filed December 29, 1920. Serial No. 433,794.

*To all whom it may concern:*

Be it known that I, STANLY TANSKI, citizen of the United States, residing at East Vandergrift, in the county of Westmoreland and State of Pennsylvania, have invented certain new and useful Improvements in Mousetraps, of which the following is a specification.

This invention relates to animal traps, being intended more particularly for embodiment as a mouse or rat trap.

The invention has for an object to provide a novel and simplified form of trap which can be cheaply manufactured.

For further comprehension of the invention, and of the objects and advantages thereof, reference will be had to the following description and accompanying drawings, and to the appended claims in which the various novel features of the invention are more particularly set forth.

Figure 1 of the drawings is a central longitudinal sectional view of a trap constructed according to the invention.

Fig. 2 is a plan view thereof.

Fig. 3 is a front end view.

Fig. 4 is a fragmentary view of the device whereby the latch supporting frame may be held in different vertically adjusted positions.

As here shown my improved trap comprises a solid rectangular base 10 having a staple 11 fixed in the face thereof adjacent the rear end. To this staple is hingedly connected one end of a wire cage 12 which is also of rectangular form and of somewhat smaller ground area than the base 10. The cage 12 may be conveniently formed with a doubled reinforcing strip 13 along its bottom edge which is perforated as at 14 to receive the staple 11.

Extending upwardly from the base 10 at the front end and near the sides thereof are a pair of tubular posts 15 which support an adjustable inverted U-shaped frame element in the form of a horizontal bar 16 the ends of which are turned downwardly as at 17 and have telescopic connection with the posts 15. To adjustably hold the frame thus formed the posts 15 have flat springs 18 fixed at one end thereto and having bowed portions 19 at their free ends adapted to engage in the desired one of notches 20 spaced vertically along the downturned ends 17 of the frame.

From the horizontal bar 16 is freely suspended a link 21 from the lower end of which is freely suspended in turn a latch 22, the link 21 being attached to the latch at a point between the ends of the latter.

Pivotally attached at one end to the staple 11 is a bait-carrying arm 23 having an upturned hook 24 on its free end, the free end of this arm extending slightly beyond the front end of the cage 12. When the trap is set, as indicated in Fig. 1, the hook 24 engages the forward end of the latch 22, the opposite end of the latch extending under the edge of the cage 12 and supporting the latter in open position, the parts being so arranged that the weight of the cage pressing on one end of latch maintains the opposite end in engagement with the hook 24. The arm 23 may be provided at a suitable point between its ends with a pin 25 to receive the bait 26.

To hold the cage closed after the trap has been sprung I provide a pair of rods 27 arranged one on each side of the cage, and pivoted at their lower ends as at 28 to swing transversely to the adjacent walls of the latter. These rods have their upper ends inturned or hooked as at 29 and are provided with feet 30 which project under the edges of the cage, these feet having heel extensions 31 which are adapted to bear on the base to hold the rods in the inclined position shown in Fig. 3 in which the inturned upper ends 29 are clear of the sides of the cage 12, while the feet 30 are in raised position. When the cage drops the sides thereof strike the feet 30, swinging the rods 27 inwardly and causing their inturned ends 29 to project over the top of the cage in close adjacence thereto.

It is believed the manner of use of my improved trap will be apparent from the above description, the trap being set by first raising the cage 12, then swinging the latch 22 under the raised forward edge thereof and then engaging the latch with the hooked end 24 of arm 23. By raising or lowering the bar 16 the bottom of the cage may be held at different heights, enabling the trap to be conveniently adjusted to catch larger or smaller animals.

Having thus described my invention what I claim as new and desire to protect by Letters Patent of the United States is as follows:

1. An animal trap comprising a base, a cage pivotally attached thereto at one end, a latch directly engaging and supporting said cage with its opposite end raised, and a movable bait-carrying member holding said latch in operative position, and means whereby said latch may be vertically adjusted to vary the height at which the free end of the cage is supported.

2. An animal trap comprising a base, a cage pivotally attached thereto at one end, a latch adapted to have one end directly engage and support the free end of the cage in raised position, a hooked bait-carrying member adapted to engage the opposite end of the latch, and a link from which said latch is freely suspended at a point between its ends, a frame for supporting said link, and means for vertically adjusting said frame.

3. An animal trap comprising a base, a cage pivotally attached thereto at one end, a latch adapted to have one end engage and support the free end of the cage in raised position, a hooked bait-carrying member adapted to engage the opposite end of the latch, a link from which said latch is freely suspended at a point between its ends, an inverted U-shaped bar from which said link is suspended, a pair of tubular posts on said base into which the legs of the said bar project, the said legs of the bar having notches spaced therealong, and springs on said posts yieldingly engaging in said notches.

4. An animal trap comprising a base, a cage pivotally attached thereto at one end, means including a movable bait-carrying member for supporting the free end of said trap raised, a rod pivoted to said base and having a hooked upper end, a foot on said rod adapted to be engaged by said cage when the latter falls to swing the hooked upper end of the rod over the cage, and a heel extension on said foot whereby said rod may be supported in inclined position with the said hooked upper end free of the cage.

In testimony whereof I have affixed my signature.

STANLY TANSKI.